United States Patent
Hosoya

Patent Number: 5,216,307
Date of Patent: Jun. 1, 1993

[54] BEARING STRUCTURE FOR ELECTRIC MOTOR

[75] Inventor: Yukiteru Hosoya, Sawa, Japan

[73] Assignee: Mitsuba Electric Mfg. Co., Ltd., Gunma, Japan

[21] Appl. No.: 844,459

[22] Filed: Mar. 2, 1991

[30] Foreign Application Priority Data

Mar. 1, 1991 [JP] Japan .................... 3-017633[U]

[51] Int. Cl.⁵ .............................................. H02K 5/16
[52] U.S. Cl. ........................................ 310/90; 310/89
[58] Field of Search ........................... 310/90, 91, 89; 384/139, 275

[56] References Cited

U.S. PATENT DOCUMENTS

| 4,494,027 | 1/1985 | Otto | 310/89 |
| 4,688,324 | 8/1987 | Morrill | 310/90 |
| 5,089,736 | 2/1992 | Oyafuso | 310/90 |

Primary Examiner—Steven L. Stephan
Assistant Examiner—Matthew Nguyen
Attorney, Agent, or Firm—Oliff & Berridge

[57] ABSTRACT

An electric motor has a motor shaft which is rotatably supported at its base end by a motor yoke and which carries a core member. The motor includes a gear such as a worm gear press-fitted to a free end portion of the motor shaft, a front frame which is secured to a front opening of the motor yoke and which has a substantially cylindrical portion having a shaft hole through which the motor shaft extends and a bearing mounted on the motor shaft at a position between the gear and the core member, the bearing having limited axial movement along the motor shaft. The bearing structure of this motor for supporting the motor shaft is characterized in that the cylindrical portion has an inner surface corresponding to an outer surface of the bearing so that the bearing can be axially moved in the cylindrical portion, the inner peripheral surface of the cylindrical portion further being chamfered at a bottom portion thereof in conformity with the outer surface of the bearing so as to prevent the bearing from rotating relative to the cylindrical portion once the bearing has been axially moved to the bottom portion of the cylindrical portion. The shaft hole has a diameter greater than the outside diameter of the gear but smaller than the diameter of the bearing.

10 Claims, 2 Drawing Sheets

BEARING STRUCTURE FOR ELECTRIC MOTOR

BACKGROUND OF THE INVENTION

1. Field of the Invention

The present invention relates to a bearing structure for miniature electric motors suitable for use in automotive electric devices.

2. Description of the Related Art

A known miniature motor of the kind mentioned above has a gear such as a worm gear integrated with the motor output shaft so that the output of the motor is transmitted to the driven side of the motor at a reduced speed.

Conventionally, mounting of the gear such as the worm gear to the motor shaft is conducted by forcibly fitting the gear to an end of the motor shaft projecting from a front frame of the assembled motor. In this conventional embodiment, the gear cannot be withdrawn from the motor shaft once the gear is press-fitted to the motor shaft. This inconveniently prohibits various operations such as renewal of the armature core. In addition, the presence of the motor frame hampers the performance of press-fitting the gear. Furthermore, the motor shaft has to be gripped at a position remote from the motor frame, i.e., at a portion near the free end thereof, in order to avoid interference with the motor frame, so that only the extreme end portion of the motor shaft is available as the portion to which the gear is to be fitted. Consequently, the position of the gear is too largely spaced from the front frame which supports the motor shaft, which undesirably enhances the cantilever-type posture of the motor shaft carrying the gear, thus posing various disadvantages from the viewpoint of construction of the mechanism.

SUMMARY OF THE INVENTION

Accordingly, an object of the present invention is to provide a bearing structure for an electric motor which can overcome the above-described problems of the prior art.

To this end, according to the invention, there is provided a bearing structure for an electric motor of such a type having a motor yoke, a motor shaft rotatably supported at a base end thereof by the motor yoke, a core member on the motor shaft, a gear such as a worm gear press-fitted to a free end portion of the motor shaft, a front frame which is secured to a front opening of the motor yoke and having a substantially cylindrical portion integrally projecting therefrom, the cylindrical portion having a shaft hole through which the motor shaft extends, and a bearing mounted on the motor shaft at a position between the gear and the core member, the bearing having a limited axial movement along the motor shaft. The bearing structure is characterized in that the cylindrical portion has an inner peripheral surface corresponding to the outer configuration of the bearing so that the bearing can axially move in the cylindrical portion, the inner peripheral surface of the cylindrical portion further being chamfered at its bottom portion in conformity with the outer configuration of the bearing so as to prevent the bearing from rotating relative to the cylindrical portion once the bearing has been axially moved to the bottom portion of the cylindrical portion, the shaft hole having a diameter greater than the outside diameter of the gear but smaller than the diameter of the bearing.

According to the present invention, by virtue of the features mentioned above, the gear or the like can be press-fitted to a portion of the motor shaft which is as close as possible to the position of the bearing. In addition, the motor shaft can be withdrawn from the front frame even after the fitting of the gear.

The above and other objects, features and advantages of the present invention will become clear from the following description of the preferred embodiments when the same is read in conjunction with the accompanying drawings.

BRIEF DESCRIPTION OF THE DRAWINGS

The invention will be described in detail with reference to the following figures, in which.

DESCRIPTION OF THE PREFERRED EMBODIMENTS

Figure 1:
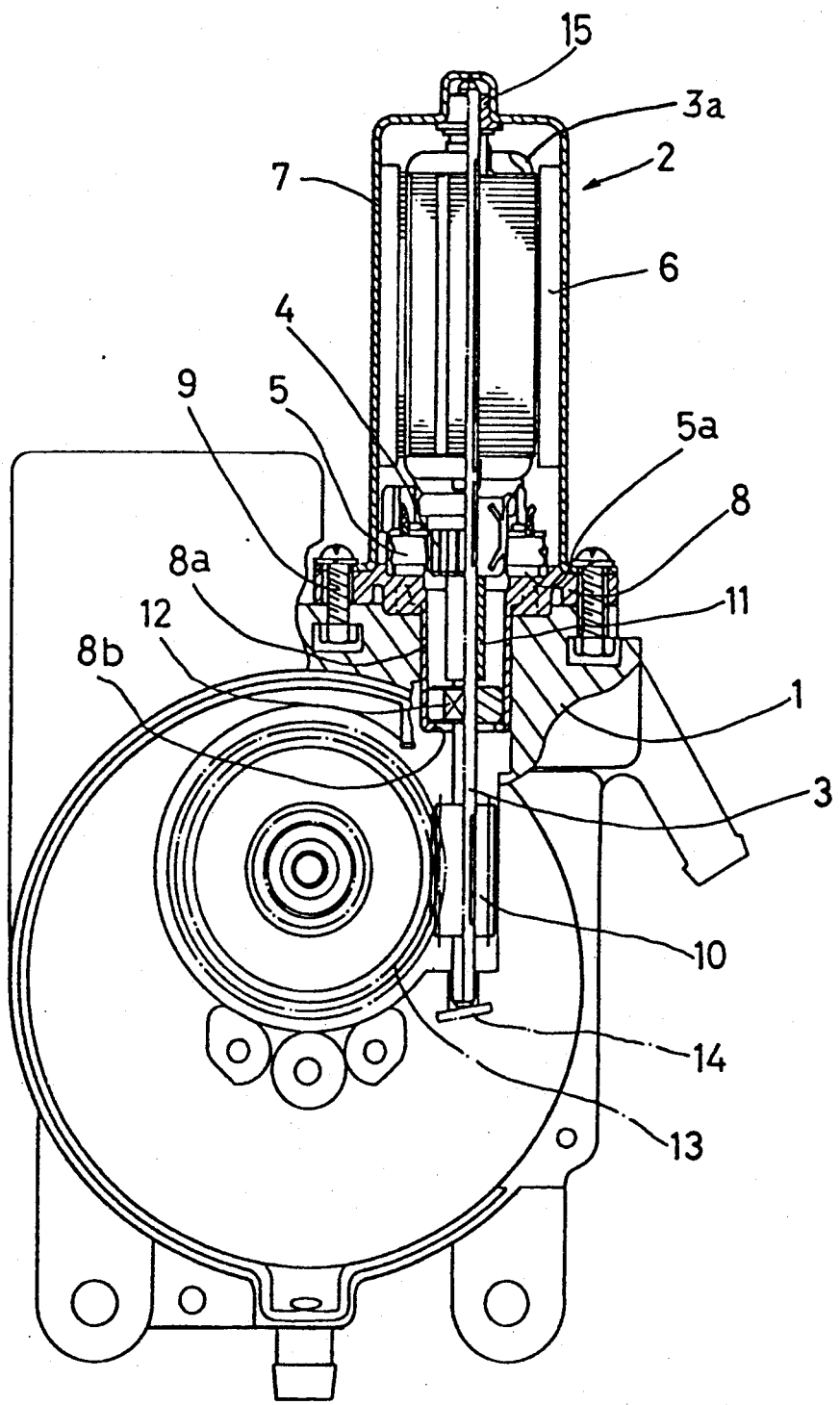
FIG. 1 is a partly-sectioned front elevational view of an electric motor incorporating a bearing structure embodying the present invention.
Figure 2:
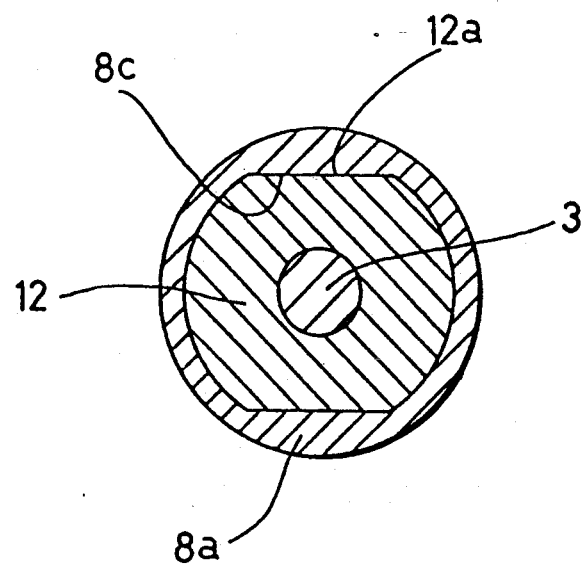
FIG. 2 is a horizontal sectional view of the electric motor of FIG. 1 taken at a plane passing through the bottom of a cylindrical portion through which a motor shaft extends.

A description will now be provided of a preferred embodiment of the present invention. Referring to the drawings, numeral 1 denotes a casing of, for example, an automotive powered antenna device. An electric motor 2 incorporating a bearing structure of the present invention is mounted in the casing 1. The electric motor 2 comprises a motor shaft 3, a motor core member 3a, a commutator 4, brushes 5, a permanent magnet 6, a motor yoke 7, and so forth. The motor yoke 7 is flanged at its front end which is opened. A front frame 8 having brush holders 5a is fitted in the front end opening of the motor yoke 7. The front frame 8 is secured to and integrated with the casing 1 by means of small screws 9. The motor shaft 3 extends through a cylindrical portion 8a of the front frame 8. A shaft hole 8b is formed in the bottom of this cylindrical portion 8a. The shaft hole 8b has a diameter which is smaller than that of the cylindrical portion 8a, thus leaving a bottom wall of the cylindrical portion 8a, but the diameter of shaft hole 8b is greater than the outside diameter of a worm gear 10 which is press-fitted to the end of the motor shaft 3, thus allowing the worm gear 10 to freely pass therethrough.

The end portion of the motor shaft 3 extending outward from the commutator 4 carries a spacer 11 loosely mounted thereon, a rotatable bearing 12 and the aforementioned worm gear 10, in the mentioned order from the base end to the free end of the motor shaft 3. The movement of the bearing 1 towards the commutator 4, i.e., towards the motor core, is limited by the spacer 11. The outside diameter of the bearing 12 is greater than the inside diameter of the shaft hole 8b, so that the bearing 12 cannot pass through the shaft hole 8b. The inner peripheral surface of the cylindrical portion 8a is sized and spaced in conformity with the outer configuration of the bearing 12 so as to allow the bearing 12 to slide on the motor shaft 3 in the axial direction down to the bottom of the cylindrical portion. The inner peripheral surface of the cylindrical portion 8a, however, is chamfered as at 8c, at the bottom portion of the cylindrical portion 8a, for cooperation with chamfered surfaces 12a formed on the outer peripheral surfaces of the bearing 12, thereby preventing the bearing 12 from rotating relative to the cylindrical portion 8a when the bearing 1 has been moved down to the bottom of the cylindrical portion 8a along the motor shaft 3. Thus, the bearing 12, once it has been moved down to the bottom of the cylindrical portion 8a, is prevented by the spacer 11 from moving towards the core, and is also prevented from rotating relative to the cylindrical portion 8a by the cooperation between the above-mentioned chamfered surfaces 12a, 8c. Consequently, the bearing 2 rotatably supports the motor shaft 3 on the stationary part of the electric motor 2.

In the drawings, numeral 13 designates a worm wheel which meshes with the worm gear 10, 14 denotes a thrust plate for receiving a thrust force acting on the motor shaft 3, and 15 denotes a bearing which rotatably supports the base end of the motor shaft 3.

The electric motor 2 of the embodiment having the above-described construction is assembled by the following process. Before mounting the motor shaft 3 in the front frame 8, the spacer 11, the bearing 12 and the worm gear 10 are sequentially assembled on the motor shaft 3, and the motor shaft 3 carrying these elements is inserted into the shaft hole 8b formed in the bottom of the cylindrical portion 8a of the front frame 8. The worm gear 10, which is outermost among the above-mentioned elements on the motor shaft 3, is projected to the exterior of the cylindrical portion 8a through the shaft hole 8b, while the bearing 12 is fitted in the bottom portion of the cylindrical portion 8a against rotation relative to the cylindrical portion 8a.

Thus, according to the present invention, the shaft hole 8b formed in the bottom of the cylindrical portion has a diameter greater than the outside diameter of the worm gear 10 so as to allow the worm gear 10 to freely pass therethrough. The bearing 12, however, has an outside diameter greater than the diameter of the shaft hole 8b, so that it cannot pass through the shaft hole 8b. Consequently, the bearing 12 is seated on the bottom of the cylindrical portion 8a in such a manner as not to be rotatable relative to the cylindrical portion 8a. Thus, the present invention eliminates the necessity for the performance of press-fitting the worm gear 10 to the motor shaft 3 after the completion of assembly of the motor 2 including the front frame 8, which performance is essentially necessary in the conventional motor.

In other words, according to the invention, the worm gear 10 can be press-fitted and fixed to the motor shaft 3 while the motor is still in a semi-assembled state, i.e., before the mounting of the front frame 8. Consequently, the efficiency of the assembly operation of the electric motor is appreciably improved because the fixing of the worm gear 10 can be conducted without being hampered by the front frame. In addition, the margin of the length of the motor shaft 3, which heretofore has been necessary for the purpose of gripping the motor shaft 3 during press-fitting the worm gear, can be reduced to enable the distance between the worm gear 10 and the bearing 12 to be minimized, thus avoiding a cantilevered supporting condition for the motor shaft which is inconvenient from the viewpoint of mechanical structure. Furthermore, since the worm gear 10 has a diameter smaller than that of the shaft hole 8b, the motor shaft 3 carrying the worm gear 10 fixed thereto can be freely withdrawn through the shaft hole 8b in the front frame 8, for the purpose of, for example, renewal of the whole shaft assembly including the spacer 11, bearing 12 and the worm gear 10 or, alternatively, renewal of the armature core alone.

It will be clear to those skilled in the art that the described embodiment is only illustrative and not intended for limiting the scope of the present invention. The use of the spacer for limiting the axial displacement of the bearing is not essential, and may be substituted by suitable other storing or limiting means such as a step or a shoulder formed on the motor shaft, or by means of a C-shaped pin fitted on the motor shaft. Obviously, the gear which is press-fitted to the motor shaft is not limited to the described worm gear. Namely, the described advantages of the present invention can equally be attained when the motor shaft carries a plain gear, bevel gear or other type of gear which is press-fitted thereto.

As will be understood from the foregoing description, according to the present invention, an electric motor can be assembled by mounting a bearing and a gear on a motor shaft and then inserting the motor shaft carrying the bearing and the gear into a cylindrical portion which is formed on a front frame to project therefrom. The gear which is fixed to an outer end portion of the motor shaft can be moved through a shaft hole in the bottom of the cylindrical portion so as to be positioned outside the front frame, while the bearing is retained in the bottom of the cylindrical portion in such a manner as not to be rotatable relative to the cylindrical portion.

Consequently, the necessity for the performance of fitting the gear to the motor shaft, which heretofore has been conducted after the motor has been assembled almost fully to include the frame cover, can be eliminated. Thus, the present invention makes it possible to press-fit the gear to the motor shaft while the motor is still in a semi-assembled state before the mounting of the front frame. Consequently, the operation of press-fitting the gear to the motor shaft can be conducted without being hampered by the front frame. This not only improves the efficiency of the assembly of the motor but also reduces the cantilever tendency of the motor shaft which is disadvantageous from the viewpoint of mechanical structure. Since the shaft hole has an inside diameter greater than the outside diameter of the gear fitted to the motor shaft, the motor shaft together with the gear fixed thereto can be withdrawn from the front frame for the purpose of, for example, a renewal of the whole motor shaft assembly or renewal of the armature core alone.

Although the invention has been described through its specific forms, it is to be understood that the described embodiment is only illustrative. Various changes and modifications may be imparted thereto without departing from the scope of the present invention which is limited solely by the appended claims.

What is claimed is:

1. An electric motor comprising:
    a motor yoke having a front opening;
    a motor shaft having base end and free end portions, said motor shaft rotatably supported at its base end portion by said motor yoke;
    a core member on said base end portion of said motor shaft;
    a gear press-fitted to said free end portion of said motor shaft;
    a front frame which is secured to the front opening of said motor yoke;
    a bearing mounted on said motor shaft at a position between said gear and said core member, said bearing rotatably supporting said motor shaft such that said bearing has limited axial movement along said motor shaft;

a bearing supporting structure for supporting said motor shaft by said front frame through said bearing, said bearing supporting structure comprising:

said bearing having an outside diameter which is greater than an outside diameter of said gear;

at least one chamfered portion formed on an outer surface of said bearing;

a cylindrical portion having a bottom portion which protrudes on said front frame in a direction toward said free end portion of said motor shaft, said cylindrical portion having an inner surface enabling slidable insertion of said bearing in an axial direction, said bottom portion of said cylindrical portion having a corresponding chamfered portion which engages said chamfered portion of said bearing to prevent rotation of said bearing about said motor shaft; and a shaft hole through which said motor shaft extends, said shaft hole being formed in said bottom portion of said cylindrical portion, said shaft hole having a diameter greater than said outside diameter of said gear, said shaft hole diameter being smaller than said outside diameter of said bearing.

2. The electric motor according to claim 1, wherein limiting means is mounted on said motor shaft at a position between said bearing and said base end portion of said motor shaft, said limiting means limiting the axial movement of said bearing.

3. The electric motor according to claim 2, wherein said limiting means comprises a spacer.

4. The electric motor according to claim 1, wherein said gear is a worm gear.

5. An electric motor comprising:

a motor shaft having base end and free end portions, said motor shaft being rotatably supported at its base end portion;

a core member mounted on said base end portion of said motor shaft;

a gear press-fitted to said free end portion of said motor shaft;

a front frame having a cylindrical portion, said cylindrical portion having a shaft hole in a bottom portion thereof, said motor shaft extending through said motor shaft hole, said cylindrical portion having an inner surface; and a bearing mounted on said motor shaft at a position between said gear and said core member, said inner surface of said cylindrical portion enabling slidable insertion of said bearing in an axial direction along said motor shaft, said bearing rotatably supporting said motor shaft such that said bearing has limited axial movement along said motor shaft, said bearing having an outer surface, at least one chamfered portion being formed on said outer surface of said bearing;

wherein said inner surface of said cylindrical portion cooperates with the outer surface of said bearing to enable slidable insertion of said bearing in an axial direction and to prevent rotation of said bearing about said motor shaft, said inner surface of said cylindrical portion having at least one chamfered portion at a bottom portion thereof which cooperates with said outer surface of said bearing, said chamfered bottom portion engaging said chamfered bearing portion to prevent rotation of said bearing about said motor shaft, said bearing having an outside diameter which is greater than an outside diameter of said gear, and said shaft hole having a diameter greater than said outside diameter of said gear, said shaft hole diameter being smaller than said outside diameter of said bearing.

6. The electric motor according to claim 5, wherein limiting means is mounted on said motor shaft at a position between said bearing and said base end portion of said motor shaft, said limiting means limiting the axial movement of said bearing.

7. The electric motor according to claim 6, wherein said limiting means comprises a spacer.

8. The electric motor according to claim 5, wherein said gear is a worm gear.

9. The electric motor according to claim 5, further comprising a motor yoke, said motor yoke having a front opening, said front frame being secured to the front opening of said motor yoke.

10. The electric motor according to claim 5, wherein said bottom portion of said cylindrical portion protrudes on said front frame in a direction toward said free end portion of said motor shaft.

* * * * *